(12) United States Patent
Mitchell

(10) Patent No.: US 9,415,525 B1
(45) Date of Patent: Aug. 16, 2016

(54) RADIUS CUTTING PLATFORM ASSEMBLY

(76) Inventor: David Mitchell, Hot Springs, AR (US)

(*) Notice: Subject to any disclaimer, the term of this patent is extended or adjusted under 35 U.S.C. 154(b) by 1072 days.

(21) Appl. No.: 13/545,567

(22) Filed: Jul. 10, 2012

(51) Int. Cl.
*B27C 5/02* (2006.01)
*B23Q 9/00* (2006.01)
*B25H 1/00* (2006.01)

(52) U.S. Cl.
CPC ............ *B27C 5/02* (2013.01); *B23Q 9/0021* (2013.01); *B25H 1/005* (2013.01); *Y10T 409/30644* (2015.01)

(58) Field of Classification Search
CPC ............ B23Q 9/0021; Y10T 409/30644; B25H 1/0042; B25H 1/005; B27C 5/02
USPC .................................. 144/48.6; 30/300, 310
See application file for complete search history.

(56) References Cited

U.S. PATENT DOCUMENTS

| | | | |
|---|---|---|---|
| 3,002,280 A * | 10/1961 | Bennett, Jr. | 33/27.03 |
| 4,306,598 A | 12/1981 | Peot | |
| 4,324,514 A | 4/1982 | Craven | |
| 4,630,656 A | 12/1986 | Collins | |
| 4,685,496 A | 8/1987 | Livick | |
| 4,913,206 A | 4/1990 | Altinbasak | |
| 5,038,841 A | 8/1991 | Larmon | |
| 5,153,998 A | 10/1992 | Duncan | |
| 5,515,611 A | 5/1996 | Maldonado | |
| 5,778,949 A | 7/1998 | Draves | |
| 2009/0038460 A1 * | 2/2009 | Fong et al. | 83/522.25 |

* cited by examiner

*Primary Examiner* — Matthew G Katcoff
(74) *Attorney, Agent, or Firm* — R. Keith Harrison

(57) ABSTRACT

A radius cutting platform assembly includes an assembly housing; a pivot mechanism carried by the assembly housing, the pivot mechanism adapted to pivotally attach the assembly housing to a support surface; a generally elongated router guide carried by the assembly housing, the router guide selectively adjustable with respect to the assembly housing along a linear axis; a router base having a router bit opening carried by the router guide; and at least one set of distance markings on the router guide, the distance markings indicating distance between the router bit opening in the router base and the pivot mechanism.

11 Claims, 3 Drawing Sheets

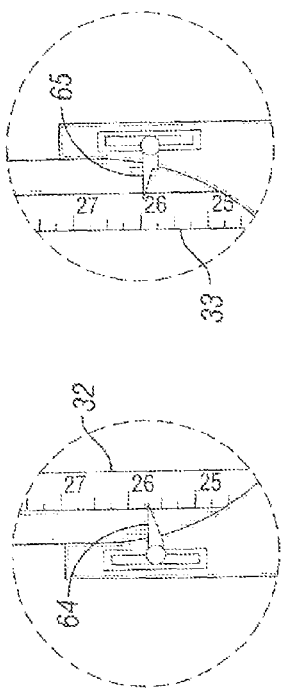
FIG. 1A
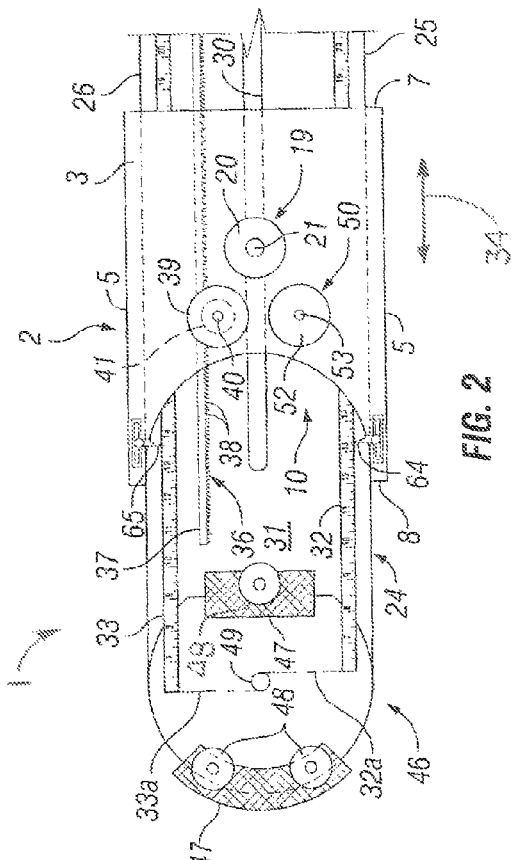
FIG. 1B
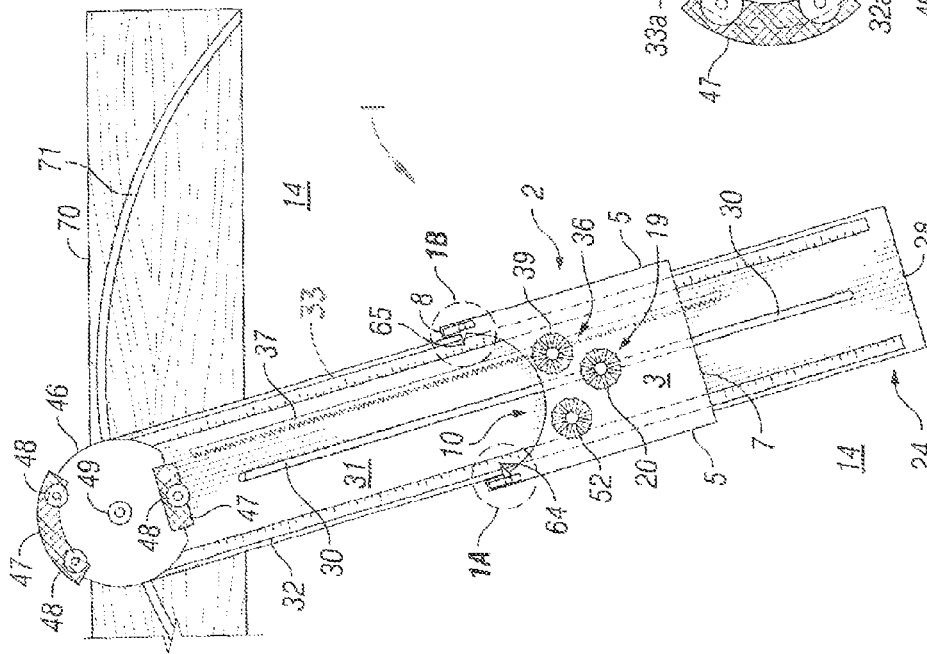
FIG. 1
FIG. 2

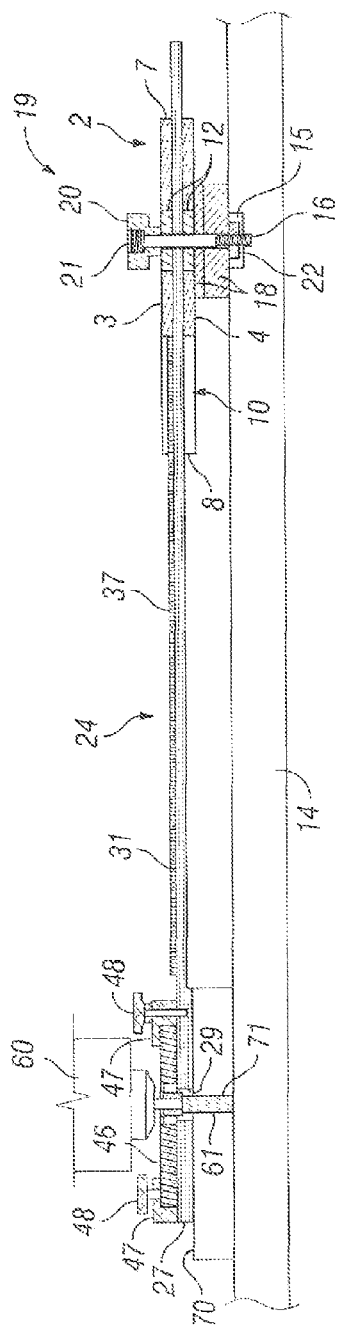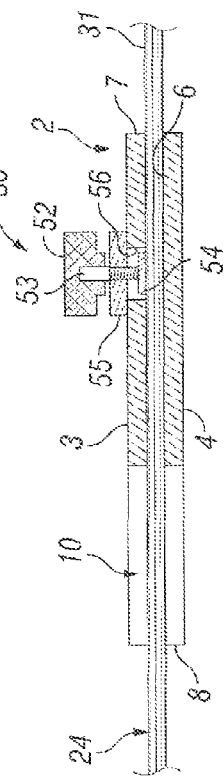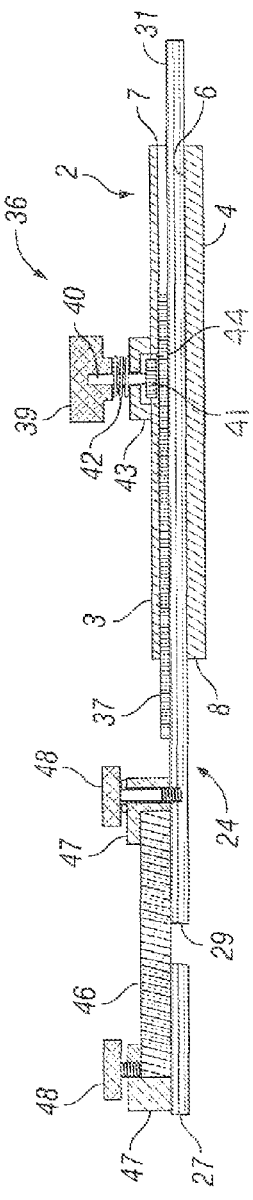
FIG. 3
FIG. 4
FIG. 5

RADIUS CUTTING PLATFORM ASSEMBLY

FIELD

Illustrative embodiments of the disclosure generally relate to devices for cutting arcs in a workpiece. More particularly, illustrative embodiments of the disclosure relate to a radius cutting platform assembly which enables a woodworker or the like to make cuts having precise diameters on a consistent basis with a minimum of set-up time and ease of use.

BACKGROUND

In woodworking, it is often desirable to make a cut along an arced, curved or elliptical path in the fabrication of items such as tables, inlays and the like. In the production of items which require specific radial dimensions on arched parts having inside and outside cuts and are required to fit within or around other curved parts, these cuts must be made with precision. Some conventional arc cutting techniques require the use of templates or pattern collars for each radius and are laborious and time-consuming to use.

Accordingly, a radius cutting platform assembly which enables a woodworker or the like to make cuts having precise diameters on a consistent basis with a minimum of set-up time and ease of use is desirable for some applications.

SUMMARY

The disclosure is generally directed to a radius cutting platform assembly. An illustrative embodiment of the radius cutting platform assembly includes an assembly housing; a pivot mechanism carried by the assembly housing, the pivot mechanism adapted to pivotally attach the assembly housing to a support surface; a generally elongated router guide carried by the assembly housing, the router guide selectively adjustable with respect to the assembly housing along a linear axis; a router base having a router bit opening carried by the router guide; and at least one set of distance markings on the router guide, the distance markings indicating distance between the router bit opening in the router base and the pivot mechanism.

BRIEF DESCRIPTION OF THE DRAWINGS

Illustrative embodiments of the disclosure will now be made, by way of example, with reference to the accompanying drawings, in which:

FIG. 1 is a top view of an illustrative embodiment of the radius cutting platform assembly in the cutting of a curved cut in a workpiece in exemplary application of the assembly;

FIG. 1A is an enlarged sectional view taken along section line 1A in FIG. 1;

FIG. 1B is an enlarged sectional view, taken along section line 1B in FIG. 1;

FIG. 2 is a top view, partially in section, of an illustrative embodiment of the radius cutting platform assembly;

FIG. 3 is a longitudinal sectional view of an illustrative embodiment of the radius cutting platform assembly in the cutting of a cut in a workpiece in exemplary application of the assembly, more particularly illustrating an exemplary pivot knob technique for pivotally mounting the assembly housing to an assembly base;

FIG. 4 is a longitudinal sectional view of an exemplary assembly housing of the radius cutting platform assembly, more particularly illustrating a router guide extending through the assembly housing and a lock knob adapted to selectively lock or secure the router guide with respect to the assembly housing;

FIG. 5 is a longitudinal sectional view of an exemplary assembly housing of the radius cutting platform assembly, more particularly illustrating a router guide extending through the assembly housing and a fine adjustment knob adapted to selectively adjust extension and retraction of the router guide with respect to the assembly housing.

DETAILED DESCRIPTION

Figure 6:
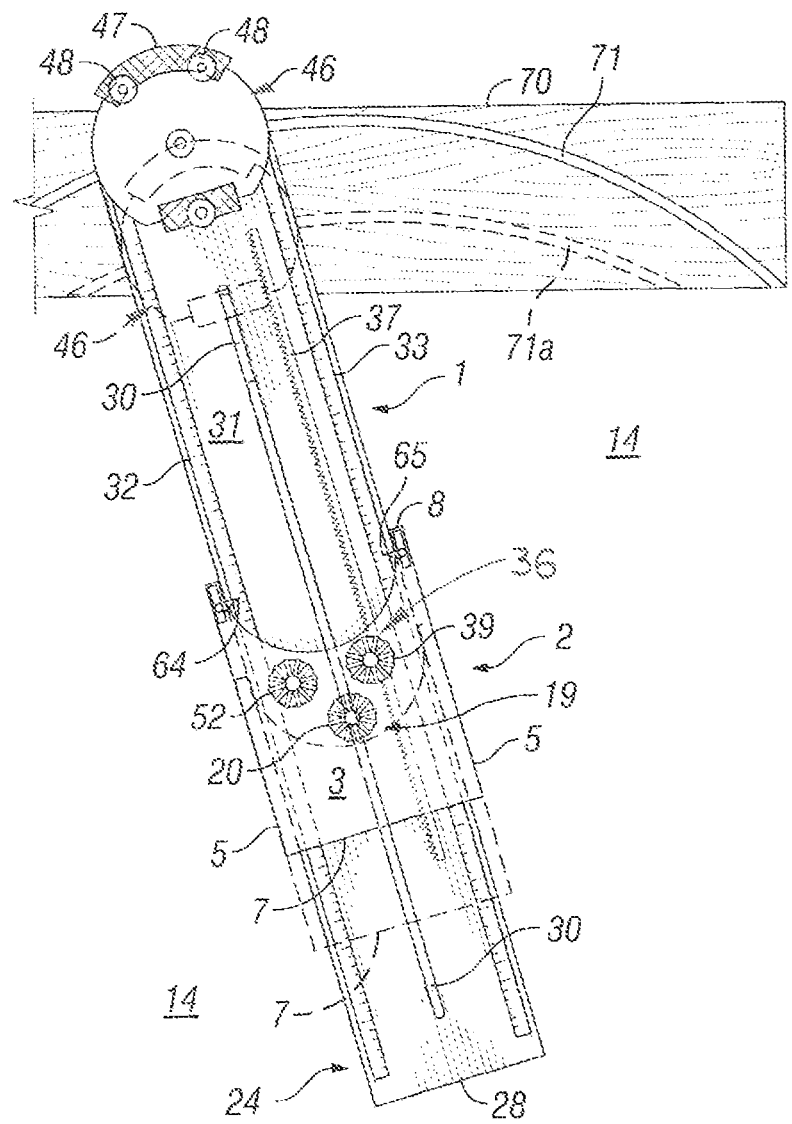
FIG. 6 is a top view of an illustrative embodiment of the radius cutting platform assembly in the cutting of first and second curved cuts in a workpiece in exemplary application of the assembly.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is non-limiting and is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "front", "rear" and "upper" as used herein are intended for descriptive purposes only and are not intended to be construed in a limiting sense.

Referring to the drawings, an illustrative embodiment of the radius cutting platform assembly, hereinafter assembly, is generally indicated by reference numeral 1. As will be hereinafter described, the assembly 1 is adapted to support a router 60 (FIG. 3) having a router bit 61. The assembly 1 can be operated to make one or more arced or curved cuts 71, 71a (FIG. 6) of selected radius in a work piece 70. Moreover, the assembly 1 can be grossly or finely adjusted to selectively and precisely vary the radius of the cut or cuts 71, 71a in the work piece 70. This expedient has favorable implications in the fabrication of products which require specific radial dimensions on arched parts having inside and outside cuts and which may be required to fit tightly within or around other curved parts, for example.

The assembly 1 includes an assembly housing 2. The assembly housing 2 is pivotally attached to a support surface 14 in stationary relationship thereto such as in a manner which will be hereinafter described. The support surface 14 may be a table, workbench or other generally flat or planar structure which is suitable to support the assembly 1 and the work piece 70 as the assembly 1 is operated to make the cut or cuts 71, 71a in the work piece 70 as will be hereinafter described. As illustrated in FIGS. 2-5, the assembly housing 2 may include an assembly housing top panel 3; an assembly housing bottom panel 4 which is parallel and spaced-apart with respect to the assembly housing top panel 3; a pair of assembly housing side panels 5 which connect the assembly housing top panel 3 and the assembly housing bottom panel 4; and an assembly housing interior 6 which is formed by and between the assembly housing top panel 3, the assembly housing bottom panel 4 and the assembly housing side panels 5. The assembly housing 2 may have a rear housing end 7 and a front housing end 8. A generally semicircular housing notch 10 may extend into the front housing end 8 of the assembly housing 2.

A router guide 24 is mounted for linear positional adjustment in the assembly housing interior 6 of the assembly housing 2. The router guide 24 may be generally elongated and rectangular with parallel, spaced-apart router guide sides 25 and 26, respectively; a front router guide end 27 (FIG. 5); a rear router guide end 28 (FIG. 1); and an upper router guide surface 31. The router guide 24 extends through the assembly housing interior 6 of the assembly housing 2 and can be selectively advanced bi-directionally through the assembly housing interior 6, as indicated by the arrow 34 in FIG. 2 and will be hereinafter further described. A router base 46 having a router bit opening 49 may be provided on the router guide 24 such as at the front router guide end 27. The router base 46 may be held in place on the router guide 24 by multiple router guide brackets 47 which may be secured to the router guide 24 using router guide bracket knobs 48. A router bit opening 29 extends through the router guide 24 and registers with the overlying router bit opening 49 in the router base 46.

A fine adjustment assembly 36 may be provided on the assembly housing 2 and the router guide 24 to facilitate selective linear advancement of the router guide 24 in either direction through the assembly housing interior 6. The fine adjustment assembly 36 may have any design which is known or may be contrived by those skilled in the art and is suitable for the purpose. For example and without limitation, in some embodiments, the fine adjustment assembly 36 may include a generally elongated fine adjustment gear rack 37 on the upper router guide surface 31 of the router guide 24. The longitudinal axis of the fine adjustment gear rack 37 may be disposed in generally parallel relationship to the longitudinal axis of the router guide 24. As illustrated in FIG. 5, a gear housing 43 may be provided on the assembly housing top panel 3 of the assembly housing 2. A gear opening 44 in the assembly housing top panel 3 of the assembly housing 2 communicates with the interior of the gear housing 43. The assembly housing interior 6 of the assembly housing 2 communicates with the interior of the gear housing 43 through the gear opening 44.

A fine adjustment knob 39 has a fine adjustment knob shaft 40 which extends through an opening (not numbered) in the gear housing 43. A spring 42 (FIG. 5) is interposed between the fine adjustment knob 39 and the gear housing 43. The spring 42 normally biases the fine adjustment knob 39 and the fine adjustment knob shaft 40 in an upward position with respect to the gear housing 43. A toothed fine adjustment gear 41 is provided on the fine adjustment knob shaft 40 in the gear opening 44. Due to the upward biasing action of the spring 42, the fine adjustment gear 41 normally disengages the gear rack teeth 38 of the fine adjustment gear rack 37 and is disposed in the interior of the gear housing 43. Upon application of downward manual pressure to the fine adjustment knob 39, the spring 42 is compressed between the fine adjustment knob 39 and the gear housing 43. Simultaneously, the toothed fine adjustment gear 41 descends from the gear housing 43 through the gear opening 44 and into the assembly housing interior 6, where the fine adjustment gear 41 meshes with gear rack teeth 38 (FIG. 2) on the fine adjustment gear rack 37. Accordingly, simultaneous downward pressure and rotation applied to the fine adjustment knob 39 causes the fine adjustment gear 41 to mesh with the rack teeth 38 of the fine adjustment gear rack 37, facilitating fine positional adjustment of the router guide 24 in either direction through the assembly housing interior 6 of the assembly housing 2.

As illustrated in FIG. 2, at least one set of distance markings 32, 33 may be provided on the router guide 24. The distance markings 32, 33 are adapted to indicate the distance between the router bit opening 49 in the router base 46 and a pivot mechanism 19 which pivotally attaches the assembly housing 2 to the support surface 14, as will be hereinafter described. In some embodiments, the distance markings 32, 33 may include indexed inside distance markings 32 which may be provided on the upper router guide surface 31 such as generally adjacent to and along the router guide side 25 of the router guide 24. The inside distance markings 32 may be measured from an inside bit position 32a which is located just to the inside of the router bit opening 49 (the side of the router bit opening 49 which is nearer to or proximate the front router guide end 27 of the router guide 24) in the router base 46 toward the rear router guide end 28 of the router guide 24. Therefore, the inside distance markings 32 are adapted to indicate the radius of the cut 71 as measured from the inside of the router bit 61 (FIG. 3). Indexed outside distance markings 33 may be provided on the upper router guide surface 31 such as generally adjacent to and along the router guide side 26 of the router guide 24. The outside distance markings 33 may be measured from an outside bit position 33a which is located just to the outside of the router bit opening 49 (the side of the router bit opening 49 which is further from the front router guide end 27 and nearer to or proximate the rear router guide end 28 of the router guide 24) in the router base 46 toward the rear router guide end 28 of the router guide 24. Therefore, the outside distance markings 33 are adapted to indicate the radius of the cut 71 as measured from the outside of the router bit 61 (FIG. 3). As illustrated in FIGS. 1, 1A, 1B and 2, an inside marking indicator pointer 64 may be provided on the assembly housing top panel 3 at the housing notch 10 and adjacent to the inside distance markings 32. The inside marking indicator pointer 64 indicates the distance from the inside bit position 32a to the pivot mechanism 19 on the inside distance markings 32. Thus, the inside marking indicator pointer 64 indicates the inside radius of a cut 71 which is to be made in the work piece 70. Similarly, an outside marking indicator pointer 65 may be provided on the assembly housing top panel 3 at the housing notch 10 and adjacent to the outside distance markings 33. The outside marking indicator pointer 65 indicates the distance from the outside bit position 33a to the pivot mechanism 19 on the outside distance markings 33. Thus, the marking indicator pointer 65 indicates the outside radius of the cut 71 which is to be made in the work piece 70. The inside distance markings 32 and the outside distance markings 33 may be any desired unit of measurement including but not limited to inches and fractions of an inch and/or centimeters and fractions of a centimeter.

The assembly housing 2 and router guide 24 may be pivotally mounted on the support surface 14 using any suitable technique which is known or may be contrived by those skilled in the art. Accordingly, in some embodiments, a pivot mechanism 19 may include an elongated router guide adjustment slot 30 which may extend through the router guide 24 in parallel relationship to a longitudinal axis of the router guide 24 and generally equidistant between the router guide sides 25, 26. As illustrated in FIG. 3, a pair of registering ball bearing collars 12 may be provided in the assembly housing top panel 3 and the assembly housing bottom panel 4, respectively, of the assembly housing 2. A pivot knob 20 may be threaded on a pivot knob bolt 21 which extends through the registering ball bearing collars 12 and protrudes beyond the assembly housing bottom panel 4. At least one thickness spacer 18, the purpose of which will be hereinafter described, may be sandwiched between the support surface 14 and the assembly housing bottom panel 4. A nut cavity 15 may be provided in the support surface 14 in registering relationship to the pivot knob bolt 21. A nut 22 in the nut cavity 15 is threaded on the pivot knob bolt 21 and tightened against the spacer or spacers 18. The pivot knob bolt 21 may extend through the nut cavity 15 and terminate in a bolt cavity 16 in the nut cavity 15. Therefore, the assembly housing 2 can be selectively pivoted about the pivot knob bolt 21 and with respect to the support surface 14 and the work piece 70 as the router bit 61 cuts the cut 71, 71a in the work piece 70 in operation of the assembly 1. As the position of the router guide 24 adjusted with respect to the assembly housing 2, the stationary pivot knob bolt 21 of the pivot mechanism 19 traverses a portion of the router mount adjustment slot 30.

A locking mechanism 50 may be provided on the assembly housing 2 to facilitate selective locking of the router guide 24 and prevent bidirectional linear displacement of the router guide 24 through the assembly housing interior 6 of the assembly housing 2. The locking mechanism 50 may have any design which is suitable for the purpose and is known or may be contrived by those skilled in the art. As illustrated in FIG. 4, in some embodiments, the locking mechanism 50 may include a lock knob 52. A lock knob shaft 53 is engaged for rotation by the lock knob 52 and is threaded through a shaft opening (not illustrated) in a lock knob disk 55 on the assembly housing top panel 3 of the assembly housing 2. A lock flange opening 56 extends through the assembly housing top panel 3 beneath the lock knob disk 55. A lock flange 54 terminates the lock knob shaft 53 and is disposed inside the lock flange opening 56. Accordingly, rotation of the lock knob 52 in a first direction facilitates tightening of the lock flange 54 against the router guide 24 as the threaded lock knob shaft 53 engages the lock knob disk 55 to prevent the router guide 24 from sliding through the assembly housing interior 6 of the assembly housing 2. Conversely, rotation of the lock knob 52 in a second direction facilitates disengagement of the lock flange 54 from the router guide 24 to facilitate selective bi-directional sliding of the router guide 24 through the assembly housing interior 6 of the assembly housing 2.

In exemplary application, the assembly 1 is used to make at least one arced or curved cut 71 in a work piece 70 using a router 60 (FIG. 3). The assembly housing 2 is pivotally attached to the workbench, table or other support surface 14 in stationary relationship thereto typically via the pivot mechanism 19 as was heretofore described with respect to FIG. 3. A selected number of the thickness spacers 18 may be placed between the support surface 14 and the assembly housing 2. The total thickness of the thickness spacers 18 may substantially equal the thickness of the work piece 70 which is to be cut. The router base 46 is mounted on the upper router guide surface 31 at the front router guide end 27 of the router guide 24 typically using the router guide brackets 47 and router guide bracket knobs 48 in the conventional manner. The router 60, which may be conventional, is attached to the router base 46 with the router bit 61 (FIG. 3) extending through the router bit opening 49, typically in the conventional manner. In typical application, the router bit 61 may be a ½" up cut, spiral fluted cutter which may be installed in the router 60 prior to pivotally mounting the assembly housing 2 to the support surface 14.

The work piece 70 may be supported on the workbench, table or other support surface 14 and may be secured thereto using clamps, mechanical fasteners and/or other suitable securing technique (not illustrated) known by those skilled in the art. As illustrated in FIG. 3, due to the spacing effects of the thickness spacers 18, the height of the front router guide end 27 of the router guide 24 generally corresponds to the thickness of the work piece 70. Therefore, the router guide 24 and router base 46 extend over the top surface of the work piece 70 as the assembly housing 2 is pivoted about the pivot knob bolt 21 (FIG. 3) of the pivot mechanism 19 and the router base 46 traverses an arced path which corresponds to the cut 71 that will be made in the work piece 70. When the router base 46 is positioned at the middle of the arced path which will define the cut 71, the longitudinal axis of the router guide 24 may extend in generally perpendicular relationship to a longitudinal axis of the work piece 70. As the router base 46 on the pivoting router guide 24 traverses the path of the arced cut 71 on either side of the perpendicular position of the router guide 24, the angle of the longitudinal axis of the router guide 24 with respect to the longitudinal axis of the work piece 70 changes throughout the path of the cut 71.

Next, the desired radius of the cut 71 which is to be made in the work piece 70 is determined and set using the inside distance markings 32 and/or outside distance markings 33 and the corresponding inside and/or outside marking indicator pointer 64, 65, respectively. If the cut 71 will define the inside of a curved piece which is to be cut from the work piece 70, then the inside distance markings 32 and inside marking indicator pointer 64 may be used. On the other hand, if the cut 71 will define the outside of a curved piece which is to be cut from the work piece 70, then the outside distance markings 33 and outside marking indicator pointer 65 may be used. Accordingly, in either case, the router guide 24 may initially be slid through the assembly housing interior 6 of the assembly housing 2 until the position of the router bit 61 closely approximates the desired radius for the cut 71. As the router guide 24 is slid through the assembly housing 2, the stationary pivot knob bolt 21 of the pivot mechanism 19 traverses a portion of the router mount adjustment slot 30. Next, the fine adjustment assembly 36 may be used to finely adjust the linear position of the router guide 24 relative to the assembly housing 2 and more precisely locate the router bit 61 at the desired radius for the cut 71. This adjustment may be accomplished by depressing the fine adjustment knob 39 to facilitate engagement of the toothed fine adjustment gear 41 with the gear rack teeth 38 (FIG. 2) on the fine adjustment gear rack 37 and simultaneously rotating the fine adjustment knob 39 to advance the router guide 24 forwardly through the assembly housing 2 until the router bit 61 reaches the desired radial path for the cut 71, as indicated by the inside distance markings 32 and inside marking indicator pointer 64 or the outside distance markings 33 and outside marking indicator pointer 65, whichever the case may be. In the example illustrated in FIG. 2, the inside radius of the proposed cut 71 (as indicated by the inside marking indicator pointer 64 and inside distance markings 32) is 13.5 inches, whereas the outside radius of the proposed cut 71 (as indicated by the outside marking indicator pointer 65 and the outside distance markings 33) is 14 inches. The fine adjustment knob 39 may then released such that the spring 42 (FIG. 5) biases the fine adjustment knob 39 away from the gear housing 43 and the fine adjustment gear 41 is retracted from the assembly housing interior 6 into the gear housing 43. Once the router bit 61 has been precisely positioned, the lock knob 52 (FIG. 4) of the locking mechanism 50 may be rotated to secure the lock flange 54 against the router guide 24 and prevent inadvertent linear movement or displacement of the router guide 24 relative to the assembly housing 2.

The router 60 is then operated to rotate the router bit 61 as the assembly housing 2 is pivoted relative to the pivot knob bolt 21 (FIG. 3) of the pivot mechanism 19 and the router bit 61 forms the curved cut 71 in the work piece 70. As the cut 71 is made, the router housing 2 may be pivoted in a direction which is opposite the direction of rotation of the router bit 61. In some applications, a first pass forming the initial cut 71 may be made with the router bit 61, followed by a second pass which forms a "cleanup cut" that is a radial offset from the first pass on the order of about 1/16". The radial offset between the second pass and the first pass can be made by actuation of the fine adjustment assembly 36, as was heretofore described.

As illustrated in FIG. 6, it will be appreciated by those skilled in the art that multiple cuts 71, 71a having various radii can be made in the work piece 70 depending on the desired application. This may be accomplished by making a first cut 71, loosening the locking mechanism 50, sliding the router guide 24 through the assembly housing 2 to position the router bit 61 at the desired radius for a second cut 71a, using the fine adjustment assembly 36 to precisely locate the router bit 61 at the radius for the second cut 71a and forming the second cut 71a by operation of the router 60 as was heretofore described.

It will be appreciated by those skilled in the art that the assembly 1 can be used to cut a circular piece in a work piece 70. Accordingly, the assembly housing 2 may be attached to a work piece 70 having a size which is larger than the diameter of the circular piece to be cut from the work piece 70 with the pivot mechanism 19 located at the center of the circular piece which is to be cut. The router bit 61 forms a circular cut in the work piece 70 as the assembly housing 2 is rotated about the pivot mechanism 19. If the circle which is cut in the work piece 70 is to have a decorative band, the final cut which is used to complete the circle is noted. The radius of the circle which is to be cut corresponds to the measurement which is indicated on the inside distance markings 32. To cut the inside radius of the decorative band, the inside radius of the circle corresponds to the same measurement on the outside distance markings 33.

While the embodiments of the disclosure have been described above, it will be recognized and understood that various modifications can be made and the appended claims are intended to cover all such modifications which may fall within the spirit and scope of the disclosure.

What is claimed is:

1. A radius cutting platform assembly, comprising:
an assembly housing;
a pivot mechanism carried by the assembly housing, the pivot mechanism adapted to pivotally attach the assembly housing to a support surface;
a generally elongated router guide carried by the assembly housing, the router guide selectively adjustable with respect to the assembly housing along a linear axis;
a router base having a router bit opening carried by the router guide;
at least one set of distance markings on the router guide, the distance markings indicating distance between the router bit opening in the router base and the pivot mechanism;
a fine adjustment assembly carried by the assembly housing and the router guide, the fine adjustment assembly adapted to finely and precisely adjust positions of the router base relative to the assembly housing;
wherein the fine adjustment assembly comprises a fine adjustment gear rack having gear rack teeth carried by the router guide, a fine adjustment knob carried by the assembly housing, a fine adjustment knob shaft engaged by the fine adjustment knob and a fine adjustment gear carried by the fine adjustment knob shaft and adapted to mesh with the gear rack teeth of the fine adjustment gear rack; and
a gear housing carried by the assembly housing and a spring interposed between the gear housing and the fine adjustment knob, the spring normally biasing the fine adjustment knob and the fine adjustment gear in a disengaging position wherein the fine adjustment gear disengages the gear rack teeth of the fine adjustment gear rack.

2. The radius cutting platform assembly of claim 1 further comprising at least one marking indicator pointer carried by the assembly housing and indicating the distance markings.

3. The radius cutting platform assembly of claim 1 further comprising a locking mechanism carried by the assembly housing, the locking mechanism adapted to selectively engage the router guide and prevent inadvertent movement of the router guide with respect to the assembly housing along the linear axis.

4. The radius cutting platform assembly of claim 3 wherein the locking mechanism comprises a lock knob disk carried by the assembly housing, a lock knob shaft threadably engaging the lock knob disk, a lock knob carried by the lock knob shaft and a lock flange carried by the lock knob shaft and adapted to selectively engage and disengage the router guide responsive to rotation of the lock knob.

5. The radius cutting platform assembly of claim 1 wherein the pivot mechanism comprises an elongated router guide adjustment slot in the router guide; a pivot knob bolt adapted for attachment to the support surface, the pivot knob bolt carried by the assembly housing and extending through the router guide adjustment slot; and a pivot knob carried by the pivot knob bolt.

6. A radius cutting platform assembly, comprising:
an assembly housing;
a pivot mechanism carried by the assembly housing, the pivot mechanism adapted to pivotally attach the assembly housing to a support surface;
a generally elongated router guide carried by the assembly housing, the router guide selectively adjustable with respect to the assembly housing along a linear axis and having a first router guide end and a second router guide end;
a router base having a router bit opening carried by the router guide;
an inside bit position on a first side of the router bit opening proximate the first router guide end;
an outside bit position on a second side of the router bit opening proximate the second router guide end;
a set of inside distance markings on the router guide, the inside distance markings indicating distance between the inside bit position on the router base and the pivot mechanism;
a set of outside distance markings on the router guide, the outside distance markings indicating distance between the outside bit position on the router base and the pivot mechanism;
a fine adjustment assembly carried by the assembly housing and the router guide, the fine adjustment assembly adapted to finely and precisely adjust positions of the router base relative to the assembly housing;
wherein the fine adjustment assembly comprises a fine adjustment gear rack having gear rack teeth carried by the router guide, a fine adjustment knob carried by the assembly housing, a fine adjustment knob shaft engaged by the fine adjustment knob and a fine adjustment gear carried by the fine adjustment knob shaft and adapted to mesh with the gear rack teeth of the fine adjustment gear rack; and a gear housing carried by the assembly housing and a spring interposed between the gear housing and the fine adjustment knob, the spring normally biasing the fine adjustment knob and the fine adjustment gear in a disengaging position wherein the fine adjustment gear disengages the gear rack teeth of the fine adjustment gear rack.

7. The radius cutting platform assembly of claim 6 further comprising an inside marking indicator pointer carried by the assembly housing and indicating the inside distance markings and an outside marking indicator pointer carried by the assembly housing and indicating the outside distance markings.

8. The radius cutting platform assembly of claim 6 further comprising a locking mechanism carried by the assembly housing, the locking mechanism adapted to selectively engage the router guide and prevent inadvertent movement of the router guide with respect to the assembly housing along the linear axis.

9. The radius cutting platform assembly of claim 8 wherein the locking mechanism comprises a lock knob disk carried by the assembly housing, a lock knob shaft threadably engaging the lock knob disk, a lock knob carried by the lock knob shaft and a lock flange carried by the lock knob shaft and adapted to selectively engage and disengage the router guide responsive to rotation of the lock knob.

10. The radius cutting platform assembly of claim 6 wherein the pivot mechanism comprises an elongated router guide adjustment slot in the router guide; a pivot knob bolt adapted for attachment to the support surface, the pivot knob bolt carried by the assembly housing and extending through the router guide adjustment slot; and a pivot knob carried by the pivot knob bolt.

11. A radius cutting platform assembly, comprising:

an assembly housing having an assembly housing interior;

a pivot mechanism carried by the assembly housing, the pivot mechanism adapted to pivotally attach the assembly housing to a support surface;

a generally elongated router guide extending through the assembly housing interior of the assembly housing, the router guide selectively adjustable with respect to the assembly housing along a linear axis and having a first router guide end, a second router guide end and opposite first and second router guide sides extending between the first router guide end and the second router guide end;

a router base having a router bit opening carried by the router guide at the first router guide end;

an inside bit position on a first side of the router bit opening proximate the first router guide end;

an outside bit position on a second side of the router bit opening proximate the second router guide end;

a set of inside distance markings on the router guide and extending along the first router guide side, the inside distance markings indicating distance between the inside bit position on the router base and the pivot mechanism;

an inside marking indicator pointer carried by the assembly housing at the first router guide side and indicating the inside distance markings;

a set of outside distance markings on the router guide and extending along the second router guide side, the outside distance markings indicating distance between the outside bit position on the router base and the pivot mechanism;

an outside marking indicator pointer carried by the assembly housing at the second router guide side and indicating the outside distance markings;

a fine adjustment assembly carried by the assembly housing and the router guide, the fine adjustment assembly adapted to finely and precisely adjust positions of the router base relative to the assembly housing;

wherein the fine adjustment assembly comprises a fine adjustment gear rack having gear rack teeth carried by the router guide, a fine adjustment knob carried by the assembly housing, a fine adjustment knob shaft engaged by the fine adjustment knob and a fine adjustment gear carried by the fine adjustment knob shaft and adapted to mesh with the gear rack teeth of the fine adjustment gear rack; and a gear housing carried by the assembly housing and a spring interposed between the gear housing and the fine adjustment knob, the spring normally biasing the fine adjustment knob and the fine adjustment gear in a disengaging position wherein the fine adjustment gear disengages the gear rack teeth of the fine adjustment gear rack.

* * * * *